United States Patent [19]

Bearce et al.

[11] Patent Number: 5,742,128
[45] Date of Patent: Apr. 21, 1998

[54] APPARATUS FOR MITIGATING THE EFFECTS OF AMBIENT MAGNETIC FIELDS ON THE OPERATION OF A CRT

[75] Inventors: Winfield Scott Bearce, Hungtington; Christopher N. Haywood, Franklin Square; John Druchunas, Sea Cliff, all of N.Y.

[73] Assignee: Orwin Associates, Inc., Amityville, N.Y.

[21] Appl. No.: 651,448

[22] Filed: May 22, 1996

Related U.S. Application Data

[63] Continuation of Ser. No. 382,437, Feb. 2, 1995, abandoned.

[51] Int. Cl.⁶ .................................................. H04N 9/29
[52] U.S. Cl. .............................. 315/8; 315/85; 313/479; 361/150; 361/152
[58] Field of Search .......................... 361/150, 149, 361/152, 153; 313/313, 402, 429, 430, 437, 479; 315/8, 85

[56] References Cited

U.S. PATENT DOCUMENTS

| | | | |
|---|---|---|---|
| 4,000,432 | 12/1976 | Coon et al. | 315/85 X |
| 4,380,716 | 4/1983 | Romeo et al. | 315/8 |
| 4,384,313 | 5/1983 | Steingroever et al. | 361/149 |
| 4,560,900 | 12/1985 | Ikegaki et al. | 315/85 X |
| 4,636,911 | 1/1987 | Truskalo | 315/8 X |
| 4,783,715 | 11/1988 | Liepe | 315/8 X |
| 4,963,789 | 10/1990 | Buhler | 315/8 |
| 4,996,461 | 2/1991 | Bentley | 315/8 |
| 5,017,832 | 5/1991 | Takita | 315/8 |
| 5,066,891 | 11/1991 | Harrold et al. | 315/8 |
| 5,216,326 | 6/1993 | Lundgren | 315/8 |
| 5,243,262 | 9/1993 | Moen | 315/370 |
| 5,260,626 | 11/1993 | Takase et al. | 315/85 |
| 5,367,221 | 11/1994 | Santy et al. | 315/8 |
| 5,379,117 | 1/1995 | Yang | 361/150 X |
| 5,404,084 | 4/1995 | Onodera et al. | 315/370 |
| 5,499,156 | 3/1996 | Bentley | 361/150 |

*Primary Examiner*—Robert Pascal
*Assistant Examiner*—Arnold Kinkead
*Attorney, Agent, or Firm*—James J. Trainor

[57] ABSTRACT

Apparatus for mitigating the adverse effects of magnetic interference on the operation of a CRT is provided. More specifically, magnetic sensors are placed in a gap formed between a front bezel and a rear enclosure comprising a magnetic shield enclosing all but the viewing surface of a CRT. The gap serves to concentrate the on-axis magnetic field and the resultant signal from the sensors is amplified to drive current through a compensation coil located inside the front bezel and in front of the viewing surface of the CRT. The current generates a compensation field that mitigates the incoming on-axis magnetic field. The ambient magnetic field is also sensed by a three axis magnetic sensing assemblage located outside the magnetic shield. The output of the sensing arrangement is operated on to produce a trigger to start a degauss cycle. A resonant degauss circuit, including a degauss coil also disposed around the inside of the front bezel and in front of the viewing surface of the CRT, is driven by a balanced bridge rail switch which repeatedly reverses the polarity of the voltage across the resonant circuit. This produces a high voltage squarewave that serves to drive current through the degauss coil. This generates a degauss field which degausses the CRT.

32 Claims, 8 Drawing Sheets

5,742,128

APPARATUS FOR MITIGATING THE EFFECTS OF AMBIENT MAGNETIC FIELDS ON THE OPERATION OF A CRT

This is a continuation of application Ser. No. 08/382,437, filed on Feb. 2, 1995, now abandoned.

TECHNICAL FIELD

The invention relates to magnetic shielding and compensation, and more particularly, to magnetic shielding of cathode ray tubes (CRTs) and compensation for incoming magnetic fields that adversely affect CRT performance.

BACKGROUND

The need for nulling the magnitude of the incoming magnetic field to which a CRT is exposed is well known. A CRT's electron beam is magnetically deflected to recreate an image on the phosphor coated on the inside of the viewing area of the CRT. The precision with which the image is recreated is adversely affected, even on a black and white CRT, by an incoming or ambient magnetic field. Image degradation is even more pronounced with a color CRT where the electrons must pass through holes in a color shadow mask to impact only the intended color phosphor.

Mitigating the degrading effects of a varying incoming magnetic field is even more complicated, requiring variable compensation. In addition, while effective shielding of off axis magnetic fields, that is, fields that are perpendicular to the longitudinal axis of the CRT, can be accomplished, not without some problems, by utilizing high permeability enclosures surrounding the CRT coupled with appropriate degaussing. Of course, such enclosures cannot obstruct the viewable area of the CRT. Accordingly, such shields are not very effective in intercepting the on-axis magnetic field incoming perpendicular to the viewable surface of the CRT.

The basic mechanism for nulling the incoming on-axis magnetic field is to generate an equal and opposite compensating magnetic field to cancel the incoming field. It has been difficult to efficiently mitigate incoming magnetic fields due to the difficulty in creating an equal and opposite compensating magnetic field with apparatus that will not be noticeable to the viewer and that will not use too much power. For the foregoing reasons, there is a need for the present invention.

SUMMARY OF THE INVENTION

The present invention is directed to a system and apparatus that satisfied one or more of the shortcomings of the prior art. Systems and apparatus are provided for mitigating the effects of incoming magnetic fields on the operation of a CRT. One version of the invention utilizes a two part magnetic shield enclosure enclosing substantially all but the viewing surface of the CRT. The two parts of the magnetic shield, a front bezel and a rear enclosure, are spaced apart from each other by a gap. An on-axis magnetic field sensor assemblage is disposed in the gap. A compensating field coil, disposed inside the bezel around the outside of the viewing area of the CRT, is driven by an on-axis field coil amplifier in response to the output of the field sensor assemblage to null the incoming on-axis magnetic field.

A system for degaussing the CRT is also provided which includes a field sensing assemblage disposed outside the enclosure which measures the ambient magnetic field and generates representative signals. Means are provided for generating a degauss signal in response to these magnetic field signals to start the degauss cycle. The degauss signal triggers a series of repetitive voltage reversals across a resonant circuit comprising a capacitor and a degauss coil disposed inside the front bezel and outside the viewing area of the CRT. The degauss current generates a magnetic field which degausses the CRT.

BRIEF DESCRIPTION OF THE DRAWING

These and other features, aspects and advantages of the present invention will become better understood with regard to the following description, appended claims, and drawings where:

DETAILED DESCRIPTION OF THE PREFERRED EMBODIMENT

The present invention comprises a system and apparatus which will not only work in combination with each other but also independently to mitigate the degrading effects of varying incoming ambient magnetic fields. In the following description, details will be set forth to provide a thorough understanding of the present invention. It will be obvious, however, that all these details are not required to practice the present invention. In other instances, well known circuits and the like are not set forth in detail in order to avoid unnecessarily obscuring the explanation of the present invention.

Figure 1:
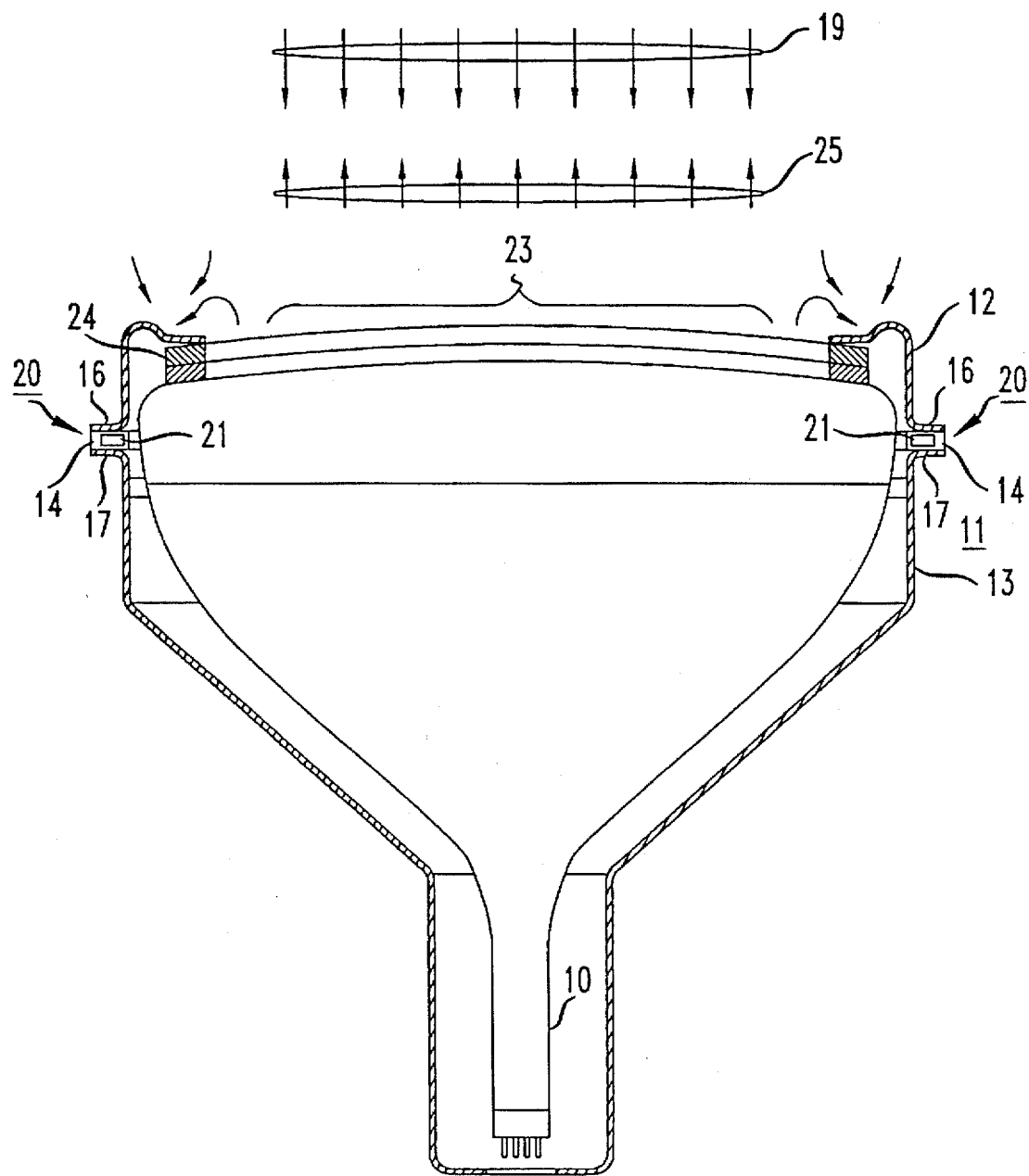
FIG. 1 is a schematic representation of a top view of a CRT encased in a two part magnetic shield enclosure in accordance with one version of the invention.

With reference to FIG. 1, cathode ray tube (CRT) 10 is encased in a high permeability magnetic shield 11 which is shaped substantially to the contour of CRT 10. Shield 11 comprises front bezel 12 and rear enclosure 13. Bezel 12 and rear enclosure 13, which are spaced apart forming gap 14, have flanges 16 and 17, respectively. Flanges 16 and 17 can be in electrical contact with each other but not in magnetic contact.

Figure 2:
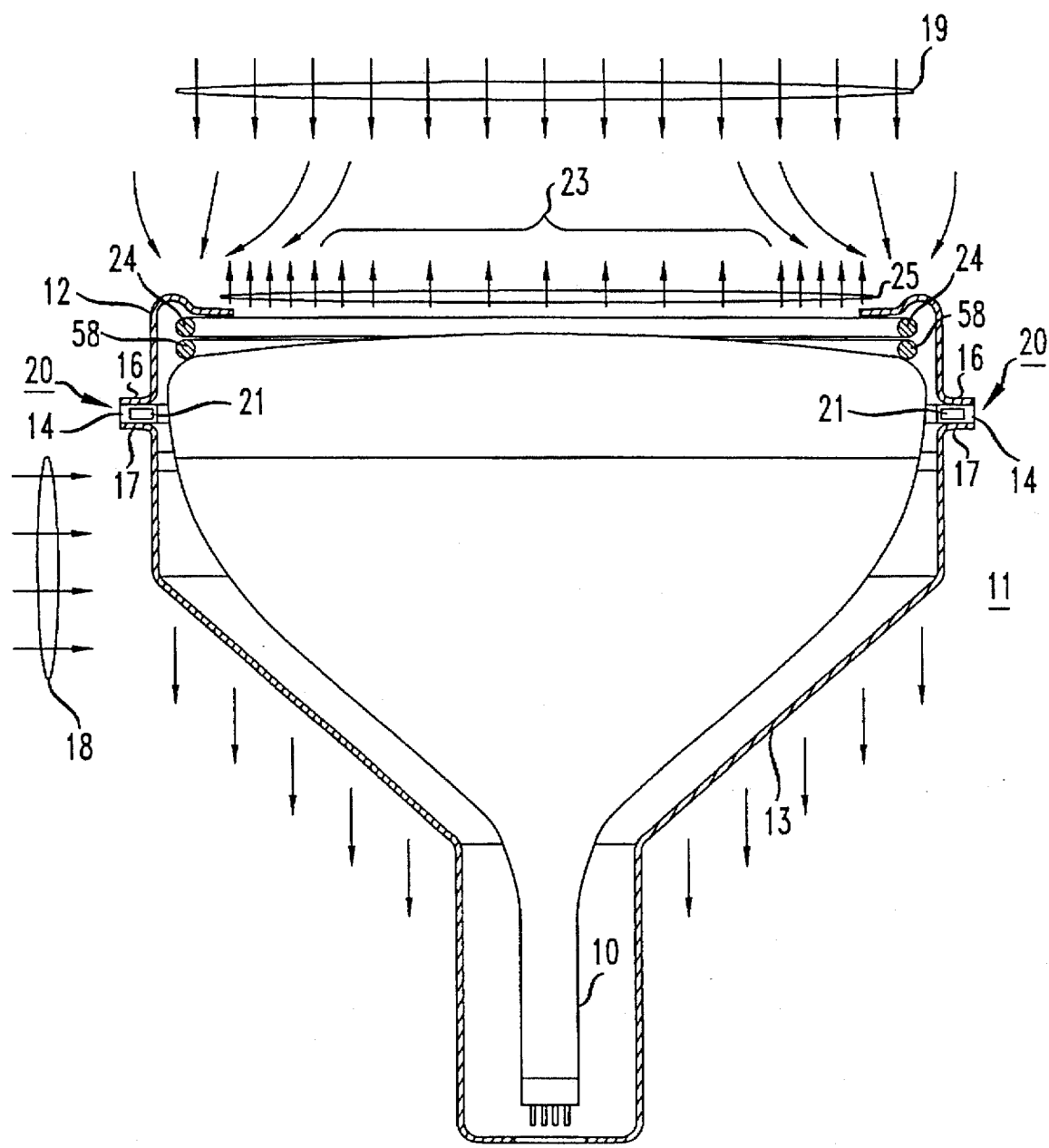
FIG. 2 is a schematic representation of the function of the front bezel of a version of the present invention in connection with an incoming on-axis magnetic field.
Figure 3:
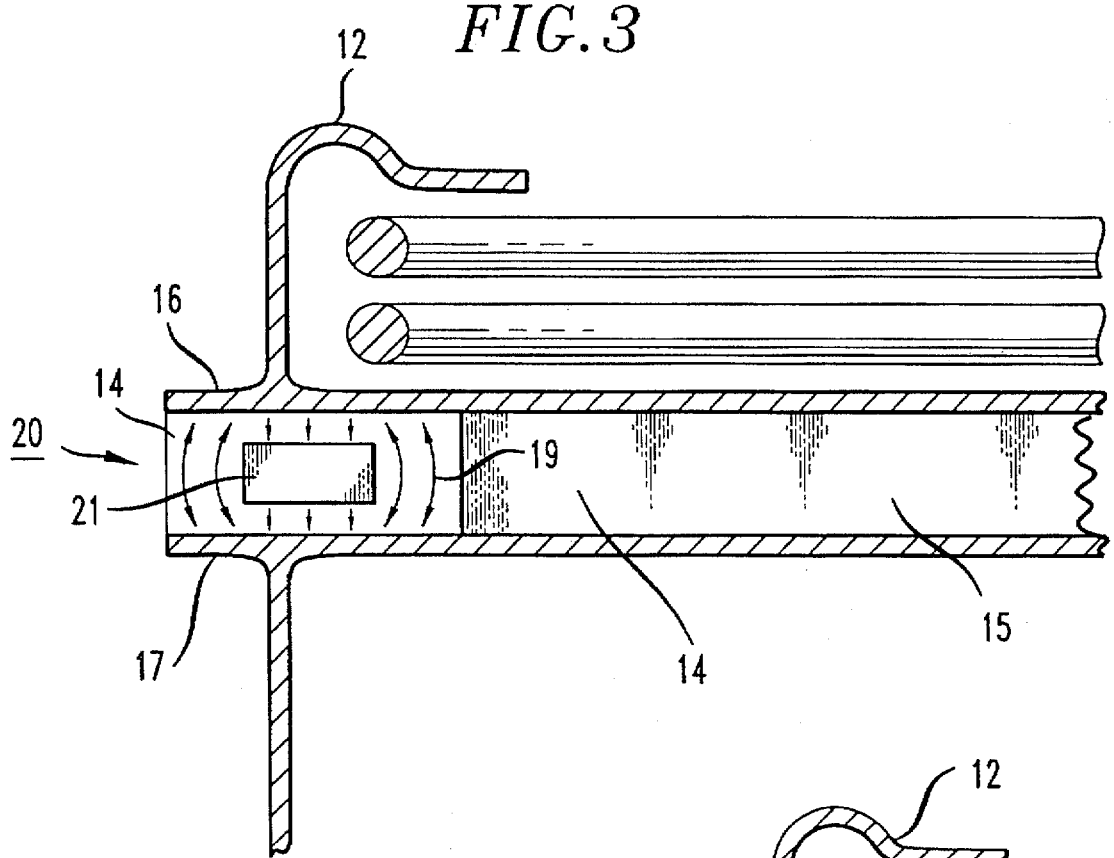
FIG. 3 is an expanded schematic representation of a top view of a sensor device located in accordance with a version of the invention.

Referring to FIGS. 2 and 3, in the preferred embodiment, gap 14 is 3/32 of an inch, small enough to prevent any significant portion of an off-axis magnetic field 18 from penetrating to the inside of enclosure 11. Keeping gap 14 small also prevents on-axis magnetic field lines 19 from flaring out and interfering with CRT 10.

On-axis sensor assemblage 20, which, in the preferred embodiment of the invention, comprises two sensor devices 21 disposed in gap 14 on the horizontal viewing axis of CRT 10, measures on-axis magnetic field 19. To maintain on-axis magnetic field 19 uniform in gap 14, flanges 16 and 17 should be flat and parallel to each other. In the preferred embodiment, an aluminum spacer 15 shaped to the configuration of flanges 16 and 17 is disposed in gap 14 around shield 11, between flanges 16 and 17 to maintain parallelism. Flanges 16 and 17 may also be utilized to mount on-axis sensor assemblage 20, however, in the preferred embodiment sensor devices 21 are mounted on extensions of printed circuit boards (not shown) which protrude into gap 14 in cutouts of spacer 15.

Gap 14 between flanges 16 and 17 functions to concentrate on-axis magnetic field 19 and effectively amplify the flux density of field 19 by a factor of 10 or more. In addition, gap 14 serves to isolate on-axis field 19 from off-axis field 18 so that on-axis field 19 can be accurately sensed.

In the preferred embodiment sensor devices 21 of on-axis sensor assemblage 20 are Hall effect devices. Such sensors have good broadband linear response for sensing magnetic fields in the region of dc to 10 KHz and higher and do not require a modulated signal as do flux coils. However, Hall effect devices have a low signal to noise ratio and poor temperature stability. The low signal to noise ratio is compensated for by the concentration of the on-axis magnetic field in gap 14, effectively amplifying the signal to be sensed. The poor temperature instability of Hall effect sensors is negated, to a large extent, by selecting Hall effect sensors with matching temperature characteristics, physically locating two such sensors back-to-back to form one sensor device 21 and using both-outputs of each sensor device 21, as will be discussed below, in a common mode differential amplifier. In this arrangement, the resulting output signal of each sensor device 21 is doubled and the drift due to temperature variations essentially cancelled.

As shown in FIG. 2, incoming on-axis magnetic field flux lines are drawn to front bezel 12, pass through gap 14 and are radiated from rear enclosure 13. The increased magnetic field in gap 14 is very uniform and more than ten times the magnitude of incoming on-axis field 19.

Figure 4:
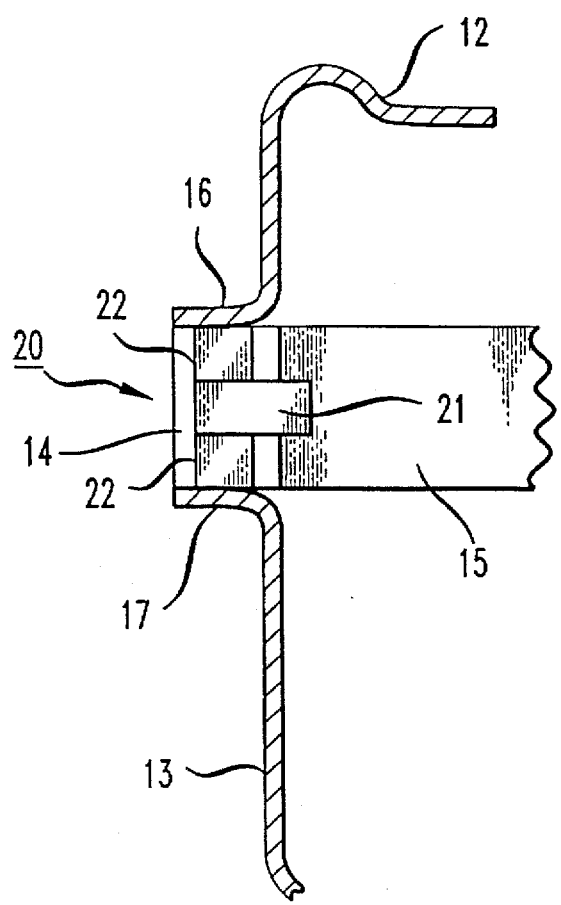
FIG. 4 is a schematic representation of an alternative design of the gap between the front bezel and the rear enclosure in accordance with a version of the invention.

Referring to FIG. 4, it may be possible to increase the magnetic field concentration in gap 14 by adding one or more spacers 22 fabricated of magnetic material. Magnetic spacer 22 would be located in the same cutout location in non-magnetic spacer 15 as are sensors 21.

Figure 5:
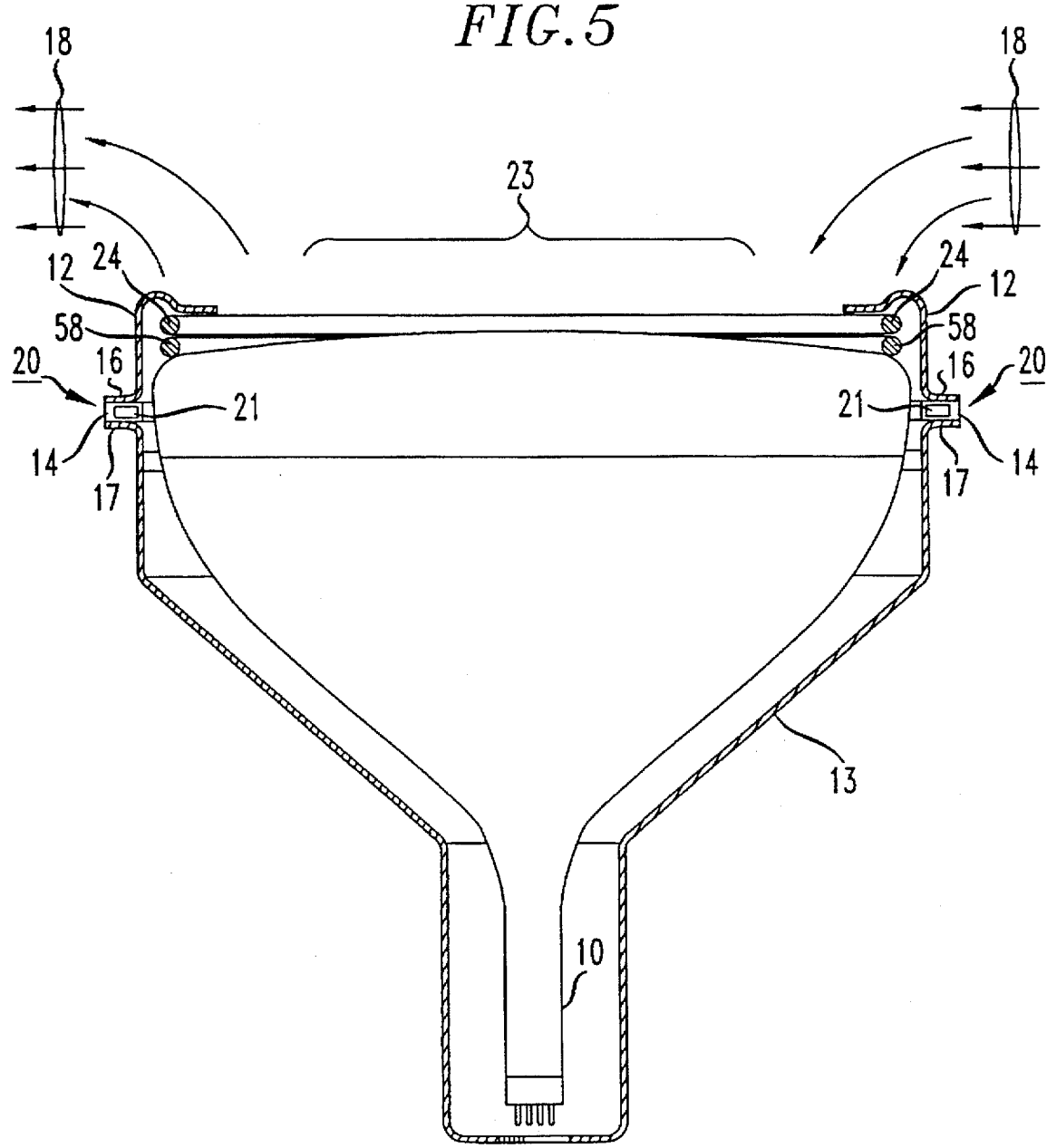
FIG. 5 is a schematic representation of a top view of the function of the front bezel of one version of the invention in connection with the horizontal component of the off-axis magnetic fields.

Referring to FIG. 5, one sensor device 21 is positioned at each side of the horizontal viewing axis of CRT 10 in gap 14. Additional sensor devices 21 could be used, if desired, preferably on the vertical axis of CRT 10, in gap 14. However, the preferred embodiment of the inventions evidenced no need for them. The invention will function with sensor devices 21 on the horizontal axis of CRT 10, on the vertical axis of CRT 10, on both axes, or even possibly other locations.

As shown, the horizontal component of off-axis magnetic field 18 is drawn into front bezel 12 on one side of CRT 10 and radiates out of bezel 12 on the other side of CRT 10. Although there is very little horizontal off-axis magnetic field 18 developed in gap 14, what is developed is equal and opposite on flanges 16 and 17. By adjusting the gains of sensor devices 21 to be equal, their outputs are nulled resulting in no horizontal off-axis compensation signal.

Figure 6:
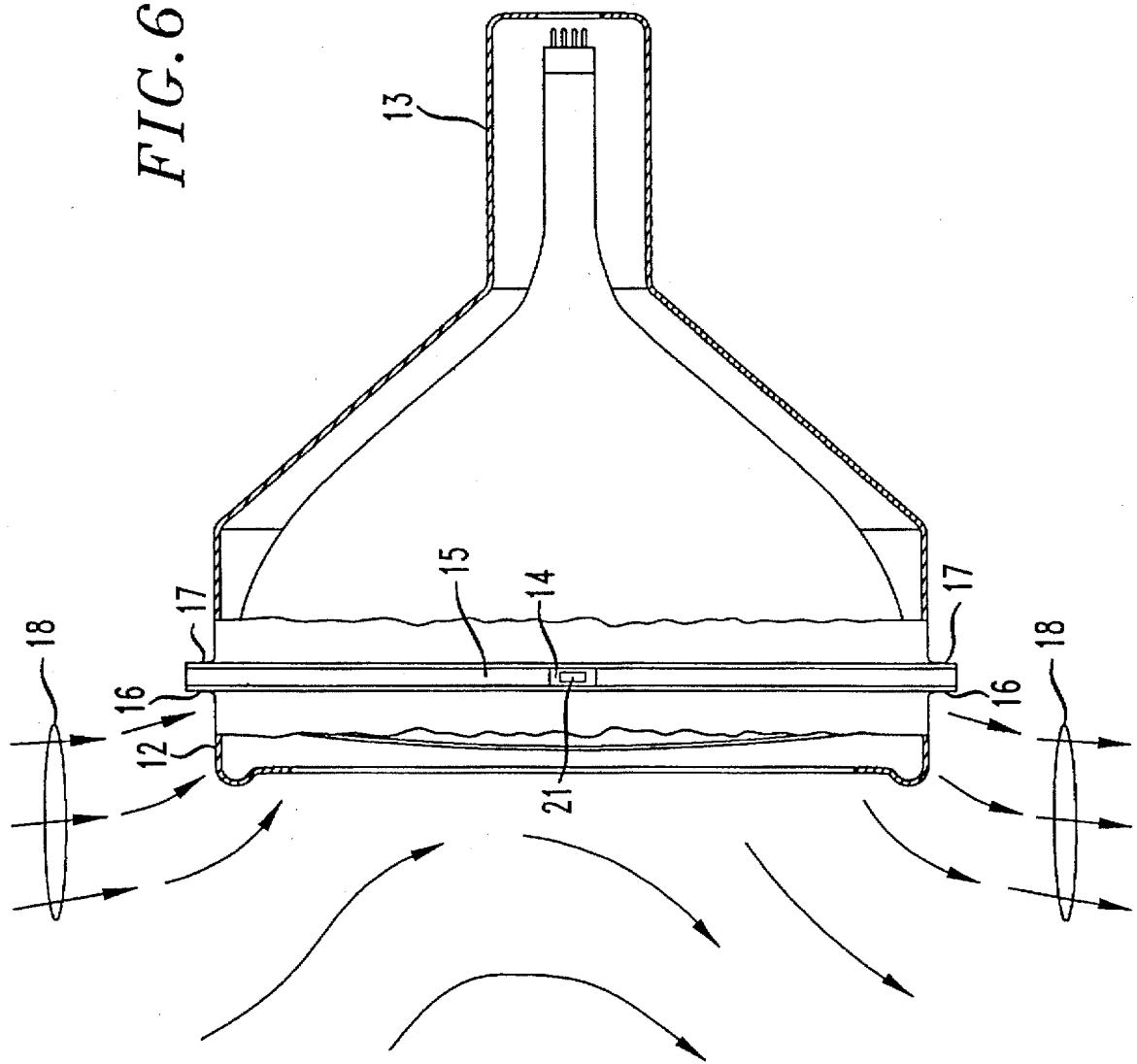
FIG. 6 is a schematic representation of a side view of the function of the front bezel of one version of the invention in connection with the vertical component of the off-axis magnetic fields.

Referring to FIG. 6, the vertical component of off-axis magnetic field 18 is at a null point at the horizontal viewing axis of CRT 10. Accordingly, by locating sensor devices 21 at locations in gap 14 along this axis, they see no signal due to the vertical component of off-axis magnetic field 18.

Referring to FIG. 2, multiple sensor devices 21 cannot be positioned so as to perfectly null on-axis magnetic field 19 at front aperture 23 of bezel 12 and since sensor devices 21 placed in front of on-axis compensation coil 24, cannot take advantage of flux concentrations in gap 14, the system of the preferred embodiment of this invention uses open loop sensing and compensation.

In the preferred embodiment, magnetic shield enclosure 11 is fabricated of AD-MU 80 nickel alloy with permeability of 60,000 in a 40 gauss field. Front bezel 12 is 0.06 inches thick and rear enclosure 13 is 0.04 inch thick. Front bezel 12 protrudes about 2-5/8 inches in front of gap 14 and about 1-5/8 inches in front of the center of the viewing surface of CRT 10 which has a 68 inch radius of curvature on its front surface. The further front bezel 12 protrudes in front of the viewing surface of CRT 10, the more effective it will be in shielding not only against off-axis field 18 but also on-axis field 19. However, the more bezel 12 protrudes in front of CRT 10, the more it will obstruct a clear view of the image on CRT 10.

For purposes of this writing and the appended claims, the space inside a surface defined by the forwardmost edge of bezel 12 is considered inside bezel 12.

CRT 10 of the preferred embodiment has a viewing surface area 15 inches by 12 inches. Front aperture 23 of bezel 12 is 15 inches by 12 inches. Of course, the present invention is equally effective on smaller or larger CRTs. A person skilled in the art could easily make any required adjustments in the dimensions of shield 11 to accommodate a smaller or larger CRT.

The preferred embodiment of this invention was designed to be able to compensate for a variable 5 gauss field, but could handle up to 9 gauss. Such limitations being more dependent on amplifier saturation than the design of shield 11.

Sensor devices 21 which are temperature stabilized as discussed above, could also be stabilized in other ways, such as with a thermistor controlled heater device.

The Hall effect sensors used in the preferred embodiment were purchased from Allegro Microsystems Inc. of Worcester, Mass., as their part number UGN3503N. Each Allegro unit is a temperature compensated Hall effect device, two of which are matched and mated to construct one sensor device 21.

Referring again to FIG. 2, on-axis compensation coil 24 is disposed in front of CRT 10 inside front bezel 12 around the outside of the viewable area of CRT 10. This location is best suited to permit on-axis magnetic field 19 to be matched by on-axis compensation field 25. Since on-axis field 19 is attracted to bezel 12, the flux lines bend from the center of aperture 23 toward the edge of bezel 12, making a much stronger field at the rim of aperture 23. Compensation coil 24 also has a stronger compensation field 25 close to on-axis compensation coil 24. Thus, shaped cancellation of on-axis magnetic field 19 is accomplished.

Figure 7:
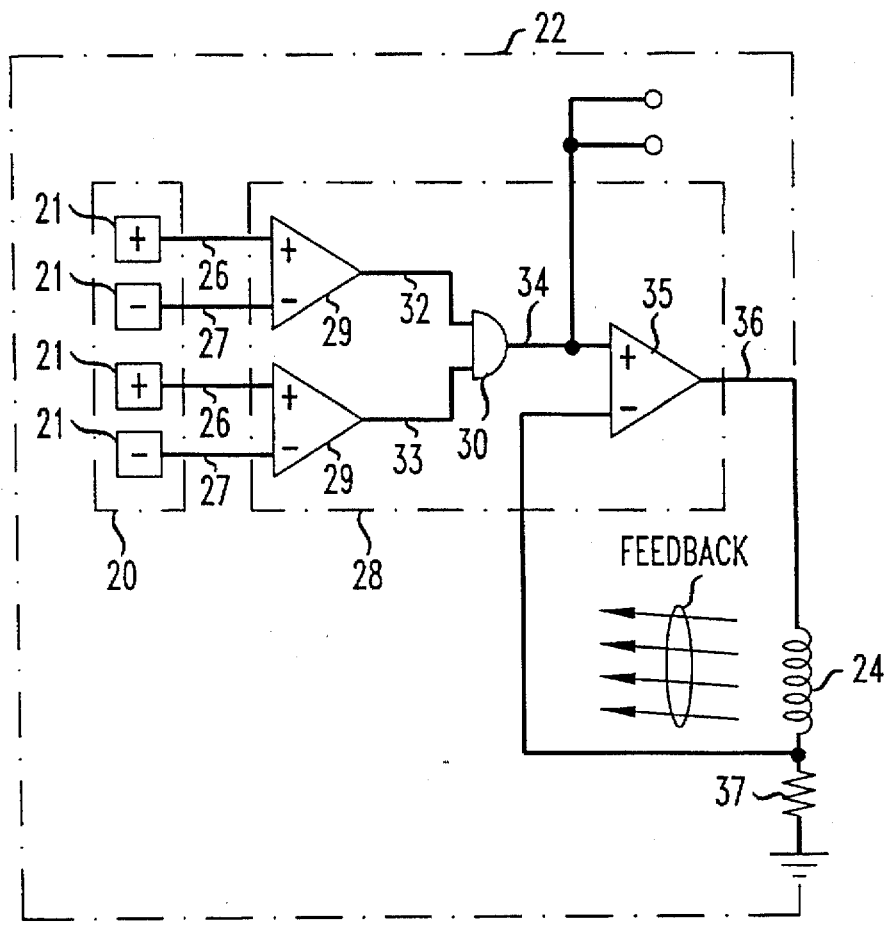
FIG. 7 is a simplified block diagram of the on-axis magnetic field compensation function of a version of the present invention.

Referring to FIGS. 1 and 7, as discussed above, on-axis magnetic field sensor assemblage 20, comprising sensor devices 21, is disposed in gap 14. Outputs 26 and 27 of each sensor device 21 are input to amplifier means 28 for driving on-axis compensation coil 24. Amplifier means 28 comprises dual operational amplifier 29, summing circuit 30, and on-axis compensation power amplifier 35. Specifically, outputs 26 and 27 of each sensor device 21 are input to opposite inputs of one-half of dual operational amplifier 29. By inputting opposite sides of one-half of dual operational amplifier 29, the total output of each sensor device 21 is doubled and its matching temperature drifts cancelled. Outputs 32 and 33 are summed in summing circuit 30 and their sum 34 input to on-axis compensation power amplifier 35, the output 36 of which drives compensation coil 24.

The resulting current through compensation coil 24 generates the on-axis compensation field 25 to counter incoming on-axis magnetic field 19. On-axis compensation field 25 also creates a positive feedback of approximately 0.2 through shield enclosure 11 to sensor assemblage 20.

The current through compensation coil 24 is sampled on a very stable sampling resistor 37 and input to on-axis compensation amplifier 35. This results in an on-axis compensation field 25 that is very accurately controlled in proportion to on-axis magnetic field 19.

Output 34 is also fed to two lower power convergence amplifiers (not shown) for horizontal and vertical convergence correction of CRT 10. The two convergence amplifiers are configured the same as on-axis compensation amplifier 35 to regulate the convergence currents of CRT 10 in proportion to incoming on-axis magnetic field 19. The two convergence amplifiers and on-axis compensation amplifier 35 all have independent adjustments to regulate the correction fields.

The described on-axis magnetic field compensation system allows for the continuous tracking and compensation of magnetic disturbance fields from dc to 20 gauss per second in the region of ±10 gauss around earth's field.

In the preferred embodiment, QUAD operational amplifier 29 is a National Semiconductor Corporation, Santa Clara, Calif., amplifier, part number LMC660, on-axis compensation power amplifier 35 is a Burr Brown Corporation, Tucson, Ariz., amplifier, part number OPA2604AP, with added power stage; and on-axis compensation coil 24 is an Orwin 400684 coil, 380 turns of number 24 formvar insulated magnet wire in a rectangle dimensioned 17 inches by 15 inches; and current sampling resistor 37 is a 1.0 ohm, 2 watt 1 percent resistor.

Figure 8:
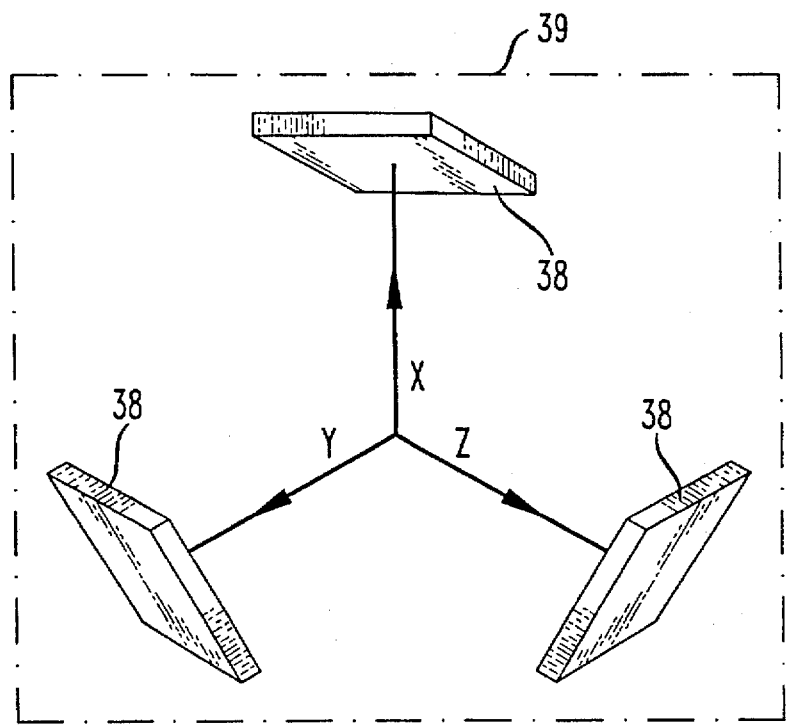
FIG. 8 is a schematic representation of a version of a three axis magnetic field sensor assemblage.

Referring to FIG. 8, sensor devices 38 are arranged in a mutually orthoginal orientation to form multi axis magnetic field sensing assemblage 39. In the preferred embodiment, sensor devices 38 are the same as sensor devices 21.

Mutli axis sensor assemblage 39 is positioned so that each sensor device 38 senses along one of the three principle axes, X, Y and Z of CRT 10. Multi axis sensor assemblage 39 is located outside the rear of shield 11, as far from shield 11 as the configuration of the video monitor or other video device utilizing CRT 10 will permit, so that shield 11 will not have an appreciable effect on the magnetic field being sensed. While a three axis magnetic field sensing assemblage 39 is used in the preferred embodiment, more, fewer, or different magnetic field sensors may be employed.

Figure 9:
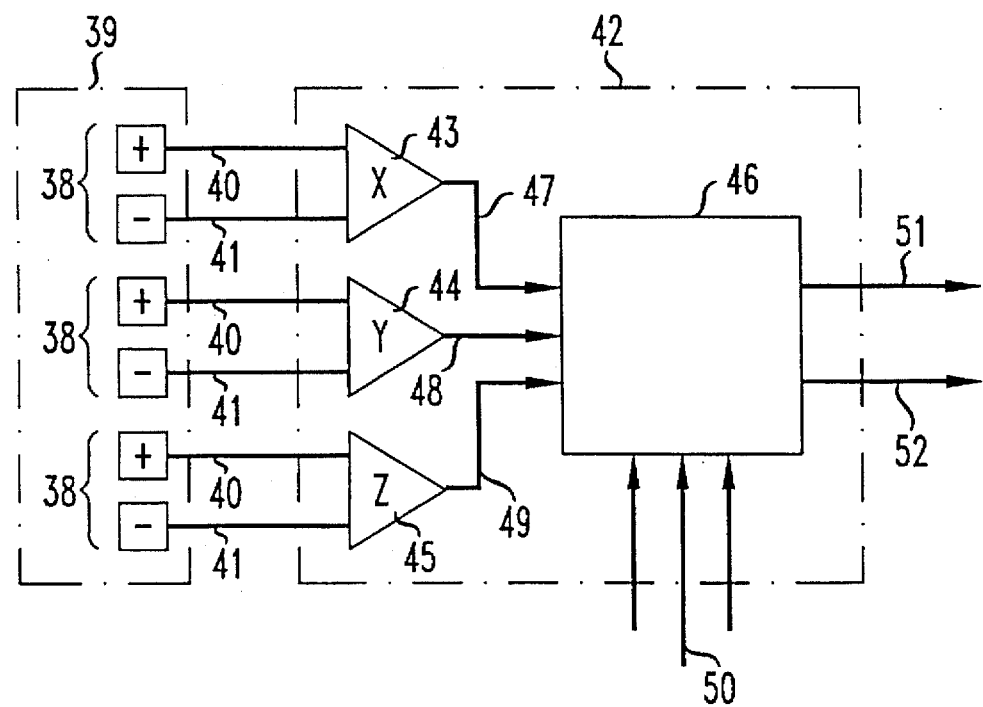
FIG. 9 is a simplified block diagram of a three dimensional magnetic field sensor and degauss control means for generating a degauss trigger.

Referring to FIG. 9, when CRT 10 is first turned on, there is a one second start delay cycle during which a degauss cycle is triggered. The digital numbers, as will be explained below, representative of the magnetic fields sensed by each of the three channels comprising sensors 38 of multi-axis sensor assemblage 39, at the end of the degauss cycle, are stored as references for such channels in microcontroller 46.

Referring to FIG. 9, outputs 40 and 41 of each sensor device 38 of multi axis sensing assemblage 39 are input to degauss signal generating means 42 comprising amplifiers 43, 44 and 45, and 8 bit microcontroller 46. Analog outputs 47, 48 and 49 are input to three muxed channels of microcontroller 46. An analog to digital converter in microcontroller 46 converts each channel, in turn, to a digital number. These digital numbers are compared with their counterpart channel digital references that were stored after the previous degauss cycle. If any of the three channels receives a signal differing more than a preset threshold from its corresponding stored reference, the next degauss cycle is triggered by degauss signal 51. The digital number representative of the magnetic field sensed by each sensor 38 at the end of each degauss cycle is used to update the corresponding reference number stored in microcontroller 46 at the end of the previous degauss cycle.

The preset threshold of any magnetic field change can be set to any appropriate level within the range of the 8 bit MUX. By setting the analog gains of sensor devices 38 such that the signals representative of a ±10 gauss magnetic field equals the full range of 8 bit microcontroller 46, the least significant bit represents 20 gauss divided by 256 or approximately 0.08 gauss or any preprogrammed set of levels that are multiple of 0.08 gauss.

In the preferred embodiment, it was found that good results were obtained with degaussing for every field change of 0.5 gauss. Since a forty-five degree off-axis magnetic field would yield 0.707 of the value of an orthoginal on-axis magnetic field, a level of 0.32 gauss was selected for the threshold.

The degaussing cycle is synchronized to the vertical field of CRT 10, by vertical sync signals 50. This constrains the degauss cycle to occur in synchronization with the internal fields generated by the deflection system of CRT 10, allowing for a consistent degauss function. Further, CRT 10 can then be blanked by frame blank signal 52 synchronous to the deflection of CRT 10 so that the viewer is not bothered by partially blanked frames.

In the preferred embodiment, amplifiers 43, 44 and 45 are National Semiconductor Corp., of Santa Clara, Calif., Quad 5 volt operational amplifier, part number LMC660. Microcontroller 46 is Microchip Technology Inc. of Chandler, Ariz., part number PIC16C71.

Figure 10:
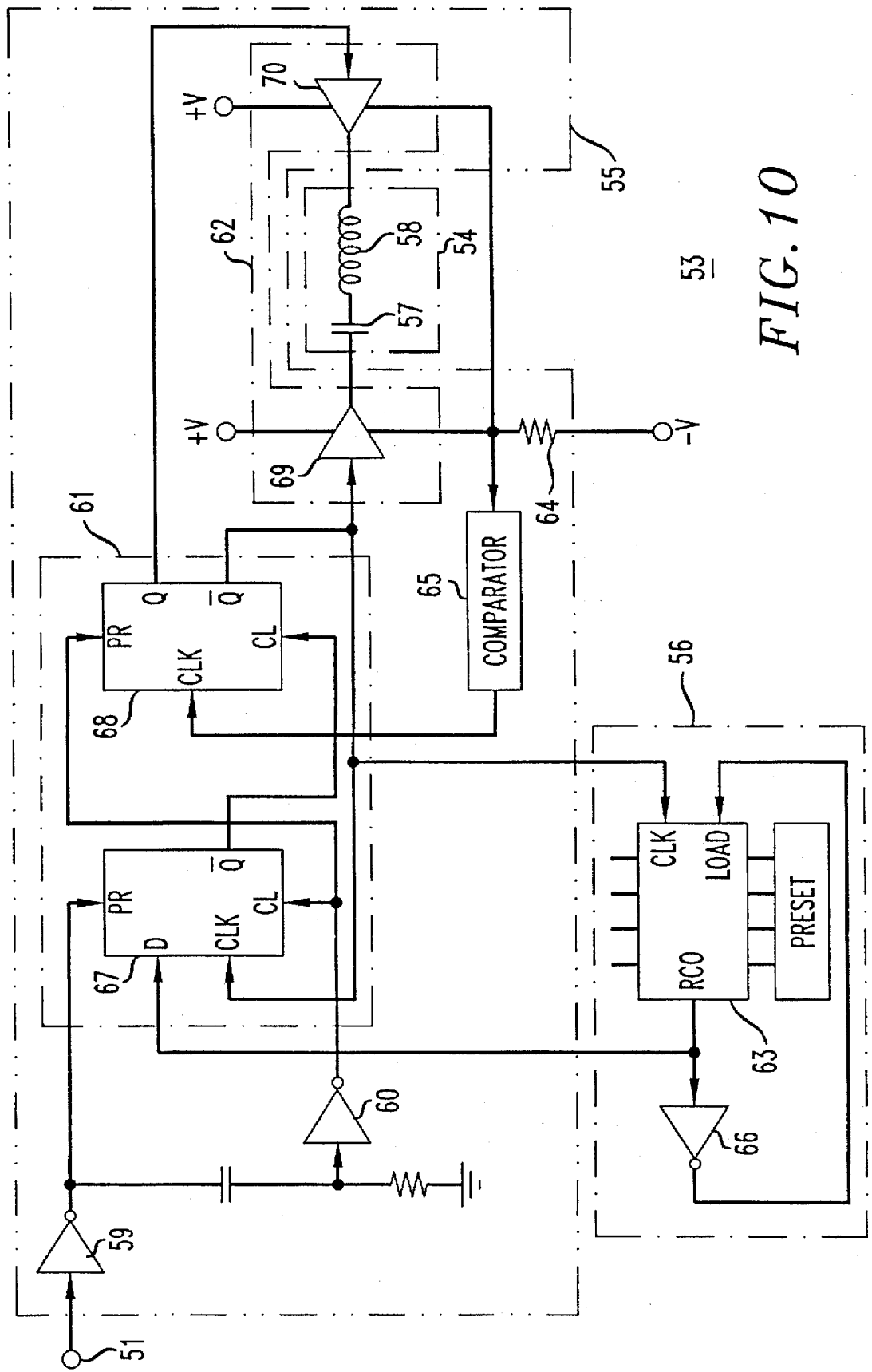
FIG. 10 is a simplified block diagram of a three axis resonant degauss driver-timer means for generating a degaussing magnetic field.

Referring to FIG. 10, the preferred embodiment of the invention includes balanced bridge resonant degauss means 53 comprising resonant circuit 54, means 55 for reversing the polarity of the voltage across resonant circuit 54 and means 56 for terminating the degauss cycle.

Resonant circuit 54 comprises resonant capacitor 57 and degauss coil 58.

Means 55 for reversing the polarity of the supply voltage across resonant circuit 54 comprises input inverter 59, inverter 60, dual flip flop 61, rail switch assemblage 62, current sensing resistor 64, and comparator 65.

Inverter 59, which receives output 51 of degauss signal generating means 42, and inverter 60, set both halves 67 and 68 of dual flip flop 61 to a "one." This causes the outputs of flip-flops 67 and 68 to trigger rail switch 62. Resonant circuit 54 is connected between the balanced bridge halves 69 and 70 of rail switch assemblage 62. Each bridge half 69 and 70 is comprised of an N channel field effect transistor (FET) and a P channel FET. When triggered, rail switch assemblage 62 serves to reverse the polarity of the supply voltage across resonant circuit 54 and current flows through resonant circuit 54 and through current sensing resistor 64.

In the quiescent state no current flows through resistor 64 and the full supply voltage is across resonant capacitor 57. When signal 51 sets dual flip flop 61 to a "one," the balanced halves 69 and 70 of rail switch assemblage 54 reverse and thus the polarity of the supply voltage across resonant circuit 54 is reversed. The response of resonant circuit 54 to this step of voltage is a damped sine wave of current. The absolute value of this current develops across current sense resistor 64. As the current through resistor 64 crosses zero, comparator 65 is triggered and sends a clock pulse to flip flop 68 switching its state and again reversing the polarity of rail switches 69 and 70. The result is a squarewave drive of resonant circuit 54.

Since the squarewave is developed by the zero crossing of the current through resistor 64, its frequency is forced to the natural frequency of resonant circuit 54. This eliminates any problem with component drift, because only at or close to the resonant frequency of resonant circuit 54 will the current build up to a sufficient level to degauss.

Means 56 for terminating the degauss cycle comprises preset-counter 63 and inverter 66. Each reversal of rail switches 69 and 70 is counted in preset counter 63. After 5 cycles counter 63 reaches its preset and resets dual flip flop 61 to zero, turning off the degauss cycle. Resonant circuit 54 then rings down in an exponential decay of about 12 cycles.

By driving a 6 KHz squarewave from the bridge circuit of rail switch 62 using an eighty-six volt power supply, a 1500 volt, peak-to-peak sine wave is generated across degauss coil 58. This develops a 130 ampere peak-to-peak current through 19 turn coil 58, or 2470 ampere turns peak-to-peak of degauss energy. After five full cycles, resonant circuit 54 is clamped at both ends allowing the degauss energy to ring down to zero in about 2 msec.

The current passing through degauss coil 58, which, as will be discussed below, is located adjacent to the viewing area of CRT 10, accomplishes the degaussing operation.

The total degauss time is 2.8 msec, 5 cycles at 0.8 msec plus 2 msec ring down time. The duration of this degauss cycle is far less than the 14 msec duration of a CRT vertical frame at a vertical frame rate of 72 Hz. Accordingly, the described balanced bridge resonant degauss is completed within one vertical frame so that by blanking that frame the degauss is almost transparent to the viewer and no picture distortion or loss of data results.

To accomplish the same task with the usual resonant fly back circuit would require a 400 volt power supply with the same current or about five times the input power. Accordingly, because of the lower energy use of the invention, degauss can be accomplished as often as every third frame. However, in actual system use, it is unlikely that the incoming magnetic field changes would be anywhere near so fast.

Referring to FIG. 2, in the preferred embodiment, degauss coil 58 is located on the inside of front bezel 12 directly in front of the viewing screen and outside the useable viewing area of CRT 10. In the prior art, the degauss coil is usually located further back on the CRT, behind its mounting flanges and thereby made less efficient by any magnetic shield employed. We have found that efficiency is improved by locating degauss coil 58 closer to the shadow mask of CRT 10. In addition, this results in a degauss field which is shaped to better eliminate the residuals of any field coming in through front aperture 23.

In the preferred embodiment, degauss coil 58 has 19 turns of number 10 heavy formvar magnet wire shaped in a rectangle dimensioned 16 inches by 13 inches; capacitor 57, made up of ten 0.22 Mf capacitors in parallel is a 2.2 Mf, 1000 volt capacitor available from Wima of Mannheim, Germany as part number MKP10/.22/1000/5; inverters 59, 60 and 66 are parts of hex inverters available from Texas Instruments, Inc., Dallas, Tex., as part number SN54HC14J; dual J-K flip flop 61 is available from Texas Instruments Inc., Dallas, Tex., as part number SN54HC74J; preset counter 63 is available from Texas Instruments Inc., Dallas, Tex., as part number SN54HC161J; comparator 65 is available from National Semiconductor Corp., Santa Clara, Calif., as part number LM139J, and power N channel and P channel FETs comprising rail switch 54 are available from Harris Corporation, Melbourne, Fla., as part numbers IRFP150 and IRFP9150, respectively.

Having described the invention, modifications will occur to those skilled in the art. The invention is defined by the attached claims.

What is claimed is:

1. A system for reducing the effects of an ambient magnetic field on the operation of a cathode ray tube (CRT) having a viewing surface, which system comprises a magnetic shield substantially enclosing all but the viewing surface of the CRT, the magnetic shield comprising a front bezel spaced apart by a gap from a rear enclosure;

a first on-axis magnetic field sensor assemblage disposed in the gap for producing a signal representative of an on-axis component of the ambient magnetic field;

an on-axis compensation field coil disposed inside the bezel around the outside of the viewing surface of the CRT;

means for driving the on-axis compensation field coil in response to the on-axis magnetic field signal, whereby the on-axis component of the ambient magnetic field is cancelled;

a second magnetic field sensor assemblage disposed outside the magnetic shield for producing signals representative of the ambient magnetic field;

means for generating a degauss signal in response to the signals representative of the ambient magnetic field;

a resonant circuit comprising a degauss coil disposed inside the bezel and around the outside of the viewing surface of the CRT;

means for connecting a voltage supply across the resonant circuit;

means for repeatedly reversing the polarity of the voltage across the resonant circuit in response to the degauss signal; and means for terminating degauss after a number of reversals whereby the current passing through the degauss coil degausses the CRT.

2. The system of claim 1 wherein the front bezel extends beyond the front viewing surface of the CRT.

3. The system of claim 1 wherein the first on-axis magnetic field sensor assemblage comprises at least one sensor device.

4. The system of claim 3 wherein each sensor device comprises two back-to-back Hall effect sensors.

5. The system of claim 1 wherein the on-axis compensation field coil is disposed in front of the CRT close to its viewing surface.

6. The system of claim 1 wherein the first on-axis magnetic field sensor assemblage serves to produce a plurality of signals representative of the on-axis component of the ambient magnetic field, and the means for driving the on-axis compensation field coil comprises:

amplifier means for amplifying and summing the on-axis magnetic field signals; and an on-axis compensation amplifier responsive to such summed signals which drives the on-axis compensation field coil thereby cancelling the on-axis magnetic field.

7. The system of claim 1 wherein the second magnetic field sensor assemblage comprises multi-axis sensor devices disposed to sense the ambient magnetic field along more than one axis.

8. The system of claim 1 wherein the second magnetic field sensor assemblage comprises three sensor devices disposed to sense the ambient magnetic field along three mutually orthogonal axes.

9. The system of claim 1 wherein the degauss coil is disposed in front of the viewing surface and outside the viewing area of the CRT.

10. The system of claim 1 wherein the degauss cycle is completed within one vertical blanked frame of the CRT.

11. A shield enclosure for shielding a cathode ray tube from magnetic field interference comprising a front bezel fabricated of magnetic material spaced apart about a substantial portion of its periphery by a non-magnetic gap from a rear enclosure also fabricated of magnetic material.

12. A system for mitigating the effects of an ambient on-axis magnetic field on the operation of a cathode ray tube (CRT) having a viewing area, which system comprises:

a magnetic shield substantially enclosing all but the viewing area of the CRT, the shield comprising a from bezel spaced apart by a gap from a rear enclosure;

an on-axis magnetic field sensor assemblage disposed in the gap for producing a signal representative of the ambient on-axis magnetic field;

a compensation field coil disposed inside the bezel and around the outside of the viewing area of the CRT;

means for driving the compensation field coil in response to the signal representative of the ambient on-axis magnetic field whereby the ambient on-axis magnetic field is cancelled.

13. The system of claim 12 wherein the on-axis magnetic field sensor assemblage comprises at least one sensor device.

14. The system of claim 13 wherein the sensor devices comprise two back-to-back Hall effect sensors.

15. The system of claim 12 wherein the compensation field coil is disposed in front of the CRT close to its viewing surface.

16. The system of claim 12 wherein the on-axis magnetic field sensor assemblage serves to produce a plurality of signals representative of the ambient on-axis magnetic field, and the means for driving the compensation field coil comprises:

amplifier means for amplifying and summing the signals representative of the ambient on-axis magnetic field; and an on-axis compensation amplifier responsive to such summed signals which drives the compensation field coil thereby cancelling the ambient on-axis magnetic field by producing a compensation magnetic field.

17. A system for degaussing a cathode ray tube (CRT) having a viewing surface exposed to an ambient magnetic field, which system comprises:

a magnetic shield fabricated of magnetic material disposed to enclose substantially all but the viewing surface of the CRT the shield comprising a front bezel spaced apart by a non-magnetic gap from a rear enclosure;

a magnetic field sensor assemblage disposed outside the magnetic shield for producing signals representative of the ambient magnetic field;

means for generating a degauss trigger signal in response to the signals representative of the ambient magnetic field;

a series resonant circuit comprising a capacitor and a degauss coil disposed around the outside of the viewing surface of the CRT;

means for connecting a voltage supply across the resonant circuit;

means for developing a repetitive, substantially constant amplitude, drive voltage across the resonant circuit at its resonant frequency by repeatedly reversing the polarity of the supply voltage across the resonant circuit at its resonant frequency in response to the degauss trigger signal whereby multiple cycles of degauss energy are rapidly developed in the degauss coil; and means for terminating a degauss cycle after a number of reversals of polarity.

18. The system of claim 17 wherein the field sensor assemblage comprises multi-axis devices disposed to sense the magnetic field along more than one axis.

19. The system of claim 17 wherein the field sensor assemblage comprises three sensor devices disposed to sense the magnetic field along each of three mutually orthoginal axes.

20. The system of claim 17 wherein the CRT has mounting flanges and the degauss coil is disposed in front of the mounting flanges.

21. The system of claim 17 wherein the degauss coil is disposed in front of the viewing surface of the CRT.

22. The system of claim 17 wherein the means for repeatedly reversing the voltage across the resonant circuit comprises:

a first and second set of P channel and N channel field effect transistors (FETs), the first set of FETs connected between a positive supply voltage connection and one side of the resonant circuit and the second set of FETs connected between a negative voltage supply connection and the other side of the resonant circuit whereby the voltage across the resonant circuit is repeatedly reversed in response to the degauss trigger signal.

23. A video monitor having a cathode ray tube (CRT) with a viewing surface, which is adapted to operate in an ambient magnetic field, which monitor comprises:

a magnetic shield substantially enclosing all but the viewing surface of the CRT, the shield comprising a front bezel spaced apart by a gap from a rear enclosure;

an on-axis magnetic field sensor assemblage disposed in the gap for producing signals representative of an on-axis component of the ambient magnetic field;

a compensation field coil disposed inside the bezel around the outside of the viewing surface of the CRT;

means for driving the compensation field coil in response to the signals representative of the on-axis component of the ambient magnetic field whereby the on-axis component of the ambient field is cancelled;

a multi-axis magnetic field sensor assemblage disposed outside the magnetic shield for producing signals representative of the ambient magnetic field;

means for generating a degauss signal in response to the signals representative of the ambient magnetic field;

a series resonant circuit comprising a degauss coil disposed inside the bezel and around the outside of the viewing surface of the CRT;

means for repeatedly reversing the polarity of the voltage across the resonant circuit at its resonant frequency in response to the degauss signal; and means for terminating degauss after a number of reversals whereby the current passing through the degauss coil degausses the CRT.

24. The monitor of claim 23 wherein the multi-axis magnetic field sensor assemblage is disposed as far from the magnetic shield as is practicable in order to minimize any distortion of the ambient magnetic field caused by such shield.

25. The monitor of claim 23 wherein the multi-axis magnetic field sensor assemblage comprises multi-axis devices disposed to sense the ambient magnetic field along more than one axis.

26. The monitor of claim 23 wherein the multi-axis magnetic field sensor assemblage comprises three sensor devices disposed to sense the ambient magnetic field along each of three mutually orthoginal axes.

27. The monitor of claim 23 wherein the degauss coil is disposed in front of the viewing surface of the CRT.

28. The monitor of claim 23 wherein the front bezel extends beyond the front of the viewing surface of the CRT.

29. A degauss system for degaussing a cathode ray tube (CRT) having a viewing surface exposed to an ambient magnetic field comprising:

a magnetic shield comprising a front bezel spaced apart by a non-magnetic gap from a rear enclosure;

a series resonant circuit comprising a capacitor and a degauss coil disposed about the viewing surface of the CRT;

means for connecting a voltage supply across the resonant circuit;

means for developing a repetitive, substantially constant amplitude, drive voltage across the resonant Circuit at its resonant frequency by repeatedly reversing the polarity of the voltage supply across the resonant circuit at its resonant frequency whereby multiple cycles of degauss energy are rapidly developed in the degauss coil; and means for terminating degauss after a number of reversals of polarity.

30. The degauss system of claim 29 wherein degauss is completed within one blanked vertical frame of the CRT.

31. A video monitor having a cathode ray tube (CRT) with a viewing surface, which is adapted to operate in an ambient magnetic field having an on-axis component, which monitor comprises:

a magnetic shield substantially enclosing all but the viewing surface of the CRT, the shield comprising a front bezel spaced apart by a gap from a rear enclosure;

an on-axis magnetic field sensor assemblage disposed in the gap for producing signals representative of the on-axis component;

a compensation field coil disposed inside the bezel around the outside of the viewing surface of the CRT; and means for driving the on-axis compensation field coil in response to the signals representative of the on-axis component whereby the on-axis component is cancelled.

32. A video monitor having a cathode ray tube (CRT) with a viewing surface, which is adapted to operate in an ambient magnetic field, which monitor comprises:

a magnetic shield substantially enclosing all but the viewing surface of the CRT, the shield comprising a front bezel spaced apart by a non-magnetic gap from a rear enclosure both fabricated of magnetic material;

a multi-axis magnetic field sensor assemblage disposed outside the magnetic shield for producing signals representative of the ambient magnetic field;

means for generating a degauss signal in response to the signals representative of the ambient magnetic field;

a resonant circuit comprising a degauss coil disposed inside the bezel and around the outside of the viewing surface of the CRT and a capacitor;

means for connecting a voltage supply across the resonant circuit;

means responsive to the degauss signal for repeatedly reversing, at the resonant frequency of the resonant circuit, the polarity of the voltage across the resonant circuit thereby developing a repetitive substantially constant amplitude, resonant frequency drive voltage across the resonant circuit whereby multiple cycles of degauss energy are rapidly developed in the degauss coil; and means for terminating degauss after a number of reversals whereby the current passing through the degauss coil degausses the CRT.

\* \* \* \* \*